United States Patent
Chen et al.

(10) Patent No.: US 11,473,531 B2
(45) Date of Patent: Oct. 18, 2022

(54) CARBURETOR

(71) Applicant: QiAn Chen, Ruian (CN)

(72) Inventors: QiAn Chen, Ruian (CN); Xingyao Zhang, Chongqing (CN)

(73) Assignee: QiAn Chen, Ruian (CN)

( * ) Notice: Subject to any disclaimer, the term of this patent is extended or adjusted under 35 U.S.C. 154(b) by 158 days.

(21) Appl. No.: 16/729,354

(22) Filed: Dec. 28, 2019

(65) Prior Publication Data

US 2021/0131381 A1    May 6, 2021

(30) Foreign Application Priority Data

Nov. 1, 2019  (CN) .......................... 201911058741.4

(51) Int. Cl.
| | |
|---|---|
| *F02M 9/127* | (2006.01) |
| *F02M 5/12* | (2006.01) |
| *F16K 31/06* | (2006.01) |
| *F02M 21/02* | (2006.01) |
| *F02M 21/08* | (2006.01) |

(52) U.S. Cl.
CPC ............ *F02M 9/1275* (2013.01); *F02M 5/14* (2013.01); *F16K 31/06* (2013.01); *F02M 21/02* (2013.01); *F02M 21/08* (2013.01)

(58) Field of Classification Search
CPC ........ F02M 9/1275; F02M 5/14; F02M 21/02; F02M 21/08; F02M 13/08; F02M 19/00; F16K 31/06; Y02T 10/30
USPC ...................................................... 261/44.5
See application file for complete search history.

(56) References Cited

U.S. PATENT DOCUMENTS

| | | | |
|---|---|---|---|
| 2003/0209274 A1* | 11/2003 | Chen ..................... | G01F 15/005 |
| | | | 137/614.21 |
| 2017/0037796 A1* | 2/2017 | Collie ................... | F02D 33/003 |

FOREIGN PATENT DOCUMENTS

| | | | |
|---|---|---|---|
| CN | 107165741 A | | 9/2017 |
| CN | 108869062 A | * | 11/2018 |
| CN | 108869062 A | | 11/2018 |

OTHER PUBLICATIONS

Office Action of CN201911058741.4.
Office Action of CN108869062A.

* cited by examiner

*Primary Examiner* — Yi-Kai Wang

(57) ABSTRACT

The present disclosure discloses a carburetor, including a fuel passage and an oil passing passage. The fuel passage communicates with the float chamber. The carburetor further includes a magnetic sleeve assembly, a magnet assembly and a thimble assembly. The magnetic sleeve assembly is fixed to a float base and a first end of the magnetic sleeve assembly extends into the oil passing passage and is connected to a body. The first end of the magnetic sleeve assembly includes a fuel passing hole and a passage, the fuel passing hole communicates with a float chamber. The passage communicates the oil passing passage. Both the thimble assembly and the magnet assembly are installed in the magnetic sleeve assembly. The thimble assembly is configured for cutting off the passage under driving of the magnet assembly to cut off a communication between the oil passing passage and the float chamber.

6 Claims, 2 Drawing Sheets

CARBURETOR

CROSS-REFERENCE TO RELATED APPLICATIONS

This application claims all benefits accruing under 35 U.S.C. § 119 from China Patent Application No. 201911058741.4, filed on Nov. 1, 2019, in the China National Intellectual Property Administration, the content of which is hereby incorporated by reference.

TECHNICAL FIELD

The present disclosure relates to the field of carburetors, and in particular, to dual-purpose oil and gas carburetors.

BACKGROUND

An oil and gas carburetor, also known as dual fuel carburetor, can use two fuels (oil and gas). In the prior art, the oil and gas carburetor can include a thimble and a main nozzle. The main nozzle is provided with a main measuring hole, and the thimble can be configured for opening and closing the main measuring hole to open or close a fuel passage. The main measuring hole, regarded as a measuring cup, can control the amount of fuel entering a carburetor mixing chamber. The thimble frequently contacting the main measuring hole will easily cause the main measuring hole to wear down and decrease precision of the main measuring hole. In addition, because the thimble and the main nozzle are independent, the coaxiality between the thimble and the main measuring hole is poor and the sealing effect is poor.

SUMMARY

An embodiment of the present disclosure includes a carburetor, including a body and a float base connected to the body. The float base includes a float chamber. The body is provided with a fuel passage and an oil passing passage, and the fuel passage communicates with the float chamber. The carburetor further includes a magnetic sleeve assembly, a magnet assembly and a thimble assembly. The magnetic sleeve assembly is fixed to the float base and a first end of the magnetic sleeve assembly extends into the oil passing passage and is connected to the body. The first end of the magnetic sleeve assembly is provided with a fuel passing hole and a passage, the fuel passing hole communicates with the float chamber. The passage communicates with the oil passing passage. Both the thimble assembly and the magnet assembly are installed in the magnetic sleeve assembly. The thimble assembly is configured for cutting off the passage under driving of the magnet assembly, in order to cut off a communication between the oil passing passage and the float chamber.

Furthermore, the magnetic sleeve assembly is further provided with a first mounting hole and a second mounting hole separated from each other. The magnet assembly includes a first magnet and a second magnet. The first magnet and the thimble assembly are installed in the first mounting hole. The second magnet is installed in the second mounting hole. The first magnet and the second magnet are mutually exclusive. The second magnet is movable in the second mounting hole, so that the first magnet is able to move in the first mounting hole under an action of a repulsion of the second magnet, resulting in driving the thimble assembly to cut off the passage.

Furthermore, the thimble assembly includes a thimble and an elastic member. The magnetic sleeve assembly is further provided with a third mounting hole between the passage and the first mounting hole. A first end of the thimble extends into the third mounting hole and is configured for cutting off the passage, and a second end of the thimble is located in the first mounting hole. The elastic member is installed in the first mounting hole and configured for resetting the thimble.

Furthermore, an axis of the thimble coincides with an axis of the passage.

Furthermore, the magnetic sleeve assembly includes a fixing sleeve and a connecting sleeve. The fuel passing hole and the passage are located in the connecting sleeve. The magnet assembly is installed on the fixing sleeve. The fixing sleeve and the connecting sleeve are connected with each other and both are fixed on the float base.

Furthermore, a mounting portion is located on an inner wall of the float chamber. The float chamber is divided into a first chamber and a second chamber. The mounting portion is provided with a fourth mounting hole. The fixing sleeve is located in the second chamber. One end of the connecting sleeve is connected to the fixing sleeve and the other end of the connecting sleeve penetrates through the fourth mounting hole, extends into the first chamber and is connected to the body. The passage and the fuel passing hole are located at one end of the connecting sleeve protruding into the first chamber.

Furthermore, the carburetor further includes a diaphragm assembly and a diaphragm cover. The diaphragm cover is installed on the float base. The diaphragm assembly is installed on the float base and a diaphragm chamber is formed between the diaphragm assembly and the diaphragm cover. The diaphragm assembly and the second magnet are separate from each other. The second magnet can be pushed to close to the first magnet by a movement of the diaphragm assembly.

Furthermore, the diaphragm assembly includes a diaphragm and an ejector rod. The magnetic sleeve assembly is further provided a through hole communicating with the second mounting hole. One end of the ejector rod is fixed on the diaphragm, and the other end of the ejector rod can penetrate through the through hole by the diaphragm, in order to push the second magnet toward the first magnet.

Furthermore, the diaphragm cover is provided with a gas passage. The gas passage communicates with the diaphragm chamber. When the gas passage is opened, the diaphragm vibrates under a pressure of the gas and drives the ejector rod to push the second magnet toward the first magnet.

Furthermore, the diaphragm assembly further includes a positioning block and a support plate. The support plate is fixed on one side of the diaphragm near the second magnet. The positioning block is fixed on the other side of the diaphragm near the diaphragm cover. One end of the ejector rod is fixed to the positioning block, and the other end of the ejector rod penetrates through the diaphragm and the support plate, and extends towards the magnetic sleeve assembly.

Compared with the prior art, the carburetor includes the magnetic sleeve assembly with the passage and the thimble assembly, both of which can cooperate with each other to control opening and closing of the fuel passage and the oil passing passage. Therefore, the wear down of the main measuring hole can be avoided. Moreover, coaxiality between the thimble assembly and the passage and a sealing effect can be improved because both the thimble assembly and the passage are located on/in the magnetic sleeve assembly.

DETAILED DESCRIPTION

The present disclosure will be further described in detail below with reference to the drawings and specific embodiments, in order to better understand the objective, the technical solution and the advantage of the present disclosure. It should be understood that the described embodiments are only a part of the embodiments of the present disclosure, but not all of the embodiments. Based on the embodiments of the present disclosure, all other embodiments obtained by one in the art without creative efforts shall be within the protection scope of the present disclosure.

It should be noted that when an element is referred to as being "fixed" to another element, it may be directly attached to the other element or a further element may be presented between them. When an element is considered to be "connected" to another element, it may be directly connected to the other element or connected to the other element through a further element (e.g., indirectly connected).

Unless otherwise defined, all technical and scientific terms used herein have the same meaning as one in the art would understand. The terminology used in the description of the present disclosure is for the purpose of describing particular embodiments and is not intended to limit the disclosure. The term "or/and" as used herein includes any and all combinations of one or more of the associated listed items.

Figure 1:
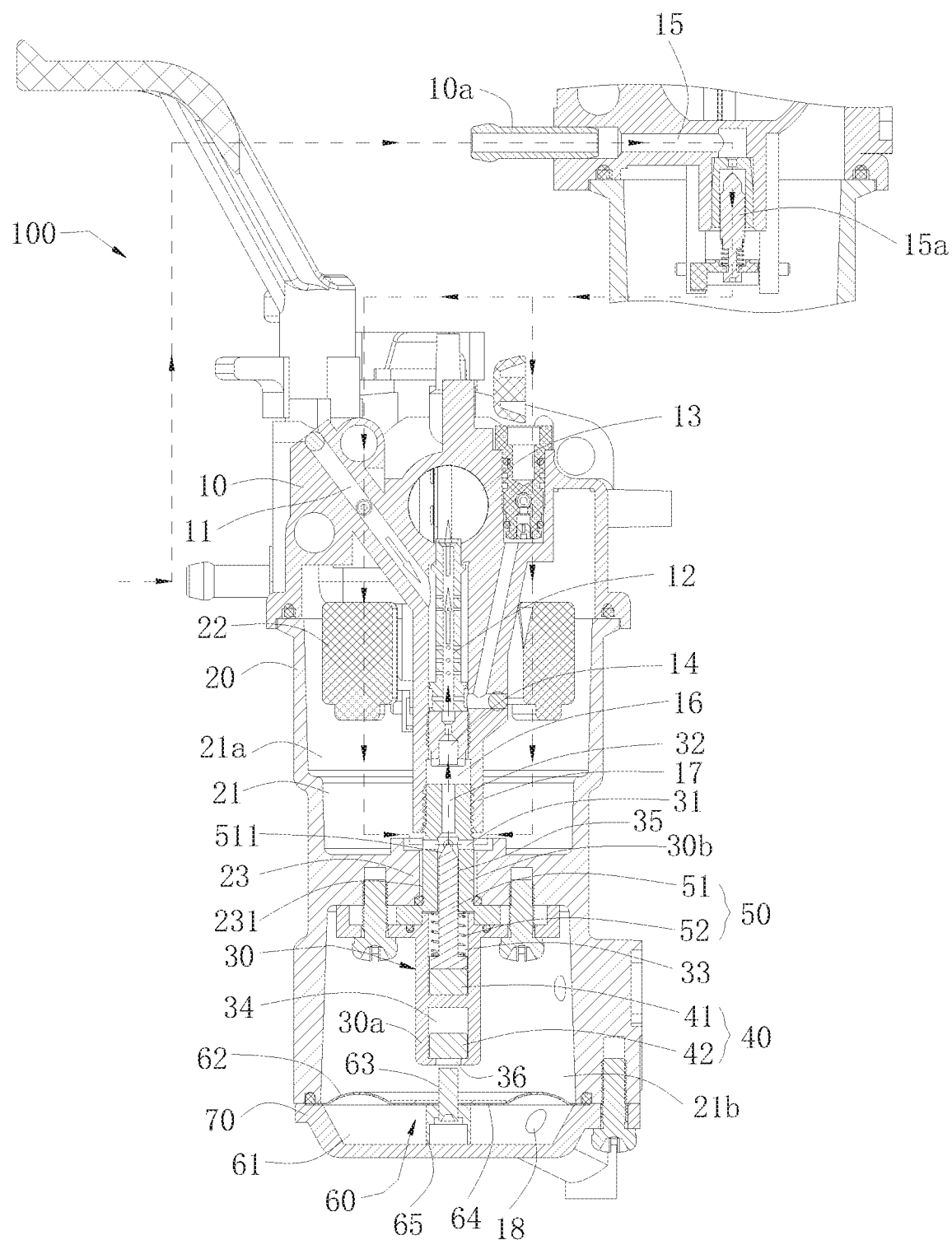
FIG. 1 is a cross-sectional view of a carburetor without gas supply in an embodiment of the present disclosure.
Figure 2:
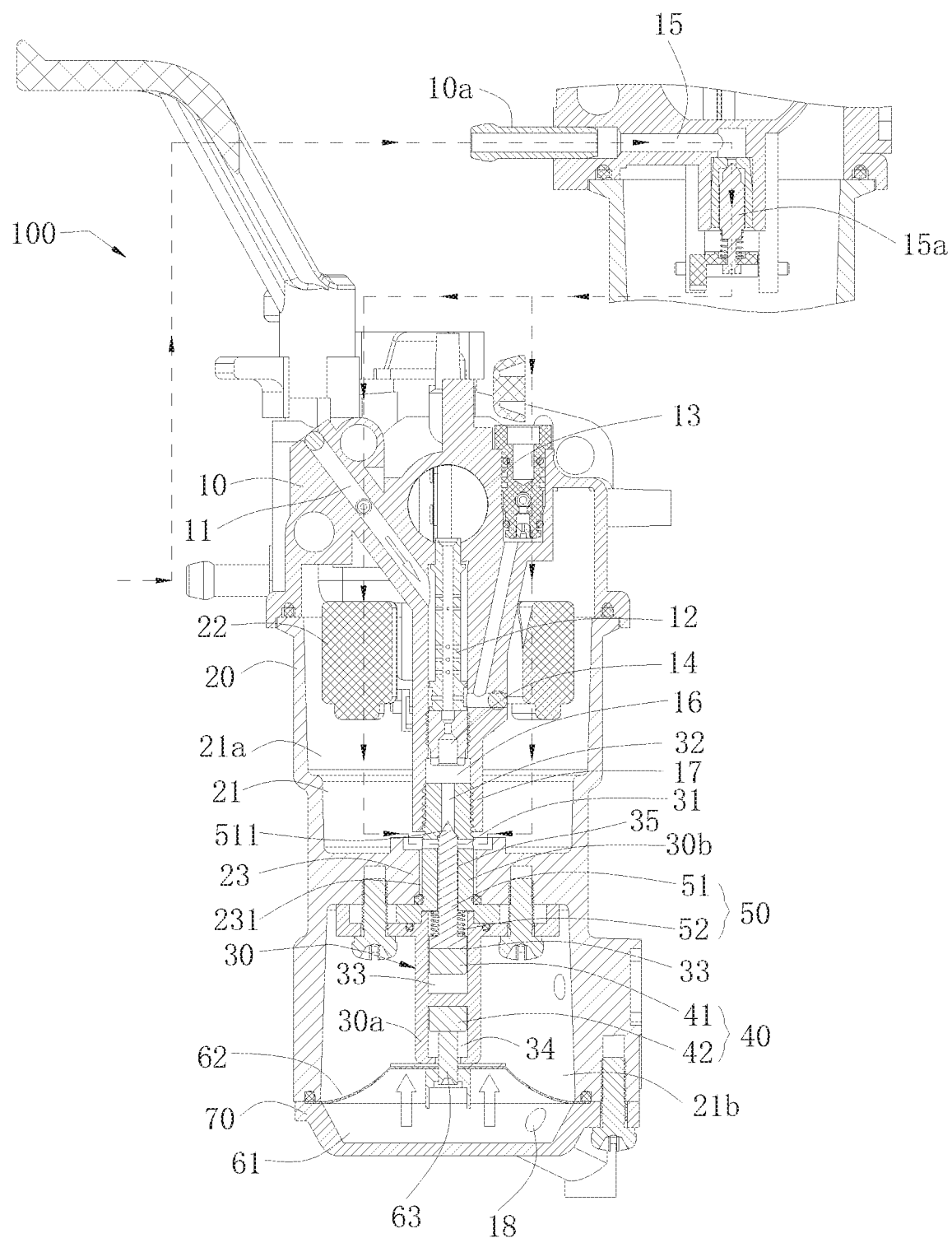
FIG. 2 is a cross-sectional view of a carburetor with gas supply in an embodiment of the present disclosure.

As shown in FIG. 1 and FIG. 2, a dual-purpose oil and gas carburetor 100 can be provided. The carburetor 100 can include a body 10 and a float base 20. The float base 20 can be mounted on and connected with the body 10.

The body 10 can include a compensating air passage 11, a main nozzle 12, a venturi 13, and a main measuring hole 14. The compensating air passage 11 can communicate with the main nozzle 12. The main nozzle 12 can communicate with the venturi 13. The main measuring hole 14 can communicate with the main nozzle 12 and be configured for controlling the amount of fuel entering the main nozzle 12.

The carburetor 100 can further include a magnetic sleeve assembly 30, a magnet assembly 40, and a thimble assembly 50. The float base 20 can include a float chamber 21 therein. The body 10 can be provided with a fuel passage 15 and an oil passing passage 16. The fuel passage 15 can communicate with the float chamber 21. The magnetic sleeve assembly 30 can be fixed on the float base 20. A first end of the magnetic sleeve assembly 30 can extend into the oil passing passage 16 and communicate with the oil passing passage 16. The first end of the magnetic sleeve assembly 30 can be provided with a fuel passing hole 31 and a passage 32. The fuel passing hole 31 can communicate with the float chamber 21. The passage 32 can communicate with the oil passing passage 16. The oil passing passage 16 can communicate with the main measuring hole 14. Both the thimble assembly 50 and the magnet assembly 40 can be installed in the magnetic sleeve assembly 30. The thimble assembly 50 can be configured for cutting off the passage 32 under the driving of the magnet assembly 40, to cut off a communication between the oil passing passage 16 and the float chamber 21.

The passage 32 can be located in the magnetic sleeve assembly 30. The thimble assembly 50 can be also installed in the magnetic sleeve assembly 30. The fuel passage 15 and the oil passing passage 16 can be controlled by the thimble assembly 50 cooperating with the passage 32, to prevent the main measuring hole 14 from being worn out. At the same time, the passage 32 and the thimble assembly 50 can be integrated on the magnetic sleeve assembly 30, so the coaxiality between the thimble assembly 50 and the passage 32 and the sealing effect can be improved.

Furthermore, the body 10 can include an extension portion 17 that extends into the float chamber 21. The oil passing passage 16 and the main nozzle 12 can be located on the extension portion 17. The magnetic sleeve assembly 30 and the extension portion 17 can be threaded connected together.

Furthermore, the body 10 can be provided with a fuel inlet pipe 10a. The fuel inlet pipe 10a can communicate with the fuel passage 15, so that oil or fuel in the fuel inlet pipe 10a can flow into the fuel passage 15.

Preferably, a needle valve 15a can be provided in the fuel passage 15, and the needle valve 15a can be opened because of oil pressure.

The float base 20 can have two opening ends. The body 10 can be hermetically connected to one opening end of the float base 20. A float 22 can be provided in the float chamber 21.

Furthermore, a mounting portion 23 can be formed on an inner wall of the float chamber 21. The mounting portion 23 can divide the float chamber 21 into a first chamber 21a and a second chamber 21b. The first end of the magnetic sleeve assembly 30 can penetrate through the mounting portion 23, extend into the first chamber 21 and be connected to the extension portion 17. A second end of the magnetic sleeve assembly 30 opposite to the first end can be located in the second chamber 21b. The fuel passage 15 can communicate with the first chamber 21a. The fuel passing hole 31 and the passage 32 can be located in the first end of the magnetic sleeve assembly 30 extending into the first chamber 21a. The fuel passing hole 31 can communicate with the first chamber 21a.

The magnetic sleeve assembly 30 can also be provided with a first mounting hole 33 and a second mounting hole 34 separated from each other. The magnet assembly 40 can include a first magnet 41 and a second magnet 42. The first magnet 41 and the thimble assembly 50 can be mounted in the first mounting hole 33, and the second magnet 42 can be mounted in the second mounting hole 34. The first magnet 41 and second magnet 41 are mutually exclusive, that is, a first end of the first magnet 41 has the same magnetic pole with a first end of the second magnet 42 facing the first end of the first magnet 41. The second magnet 42 can be movable in the second mounting hole 34, so that the first magnet 41 is able to move in the first mounting hole 33 under an action of a repulsion of the second magnet 42, resulting in driving the thimble assembly 50 to cut off the passage 32.

The first end of the first magnet 41 and the first end of the second magnet 42 facing to the first end of the first magnet 41 can be a North pole or a South pole. In one embodiment, the first end of the first magnet 41 and the first end of the second magnet 42 facing the first end of the first magnet 41 are N poles.

Furthermore, the magnetic sleeve assembly 30 can be provided with a third mounting hole 35 between the passage 32 and the first mounting hole 33. One end of the thimble assembly 50 can be located in the first mounting hole 33, and the other end of the thimble assembly 50 can extend into the third mounting hole 35 and be configured for opening or closing the passage 32.

In one embodiment, the magnetic sleeve assembly 30 can include a fixing sleeve 30a and a connecting sleeve 30b. The mounting portion 23 can be provided with a fourth mounting hole 231 therein. The fixing sleeve 30a can be fixed to the first chamber 21a, one end of the connecting sleeve 30b can be fixed to the fixing sleeve 30a, and the other end of the connecting sleeve 30b can penetrate through the fourth mounting hole 231 and extend into the second chamber 21b. The fuel passing hole 31 and the passage 32 can be located on the connecting sleeve 30b.

Further, the fixing sleeve 30a and the connecting sleeve 30b can be fixed to the mounting portion 23 by bolts, screws, and the like. The fixing sleeve 30a can be connected with the connecting sleeve 30b tightly, and the connecting sleeve 30b can be connected with the mounting portion 23.

Optionally, the first mounting hole 33 and the second mounting hole 34 can be located in the fixing sleeve 30a. The fuel passing hole 31, the passage 32, and the third mounting hole 35 can be located in the connecting sleeve 30b.

In one embodiment, an axis of the first mounting hole 33 and an axis of the second mounting hole 34 can be overlapped with each other. The axis of the second mounting hole 34 and an axis of the third mounting hole 35 can be overlapped with each other. The axis of the third mounting hole 35 can be coincident with an axis of the passage 32. It can be understood that, the axis of the third mounting hole 35 is coincident with the axis of the passage 32, so it can ensure the coaxiality between the thimble assembly 50 and the passage 32, thereby improving the sealing effect of the passage 32.

The thimble assembly 50 can include a thimble 51 and an elastic member 52. A first end of the thimble 51 can extend into the third mounting hole 35 and be configured for cutting off the passage 32. A second end of the thimble 51 opposite to the first end can be located in the first mounting hole 33. The elastic member 52 can be installed in the first mounting hole 33 and configured for resetting the thimble 51.

In one embodiment, the axis of the thimble 51 can coincide with the axis of the passage 32 to improve the sealing effect of the thimble 51 acting on the passage 32.

In one embodiment, the elastic member 52 may be a spring or other elastic component.

Further, an aperture of the third mounting hole 35 is larger than an aperture of the passage 32, and the first end of the thimble 51 away from the first mounting hole 33 has a tip portion 511, and the tip portion 511 can extend into the passage 32, so an outer wall of the tip portion 511 can abut against an inner wall of the passage 32 to achieve closing of the passage 32.

Referring to FIG. 1, the carburetor 100 can further include a diaphragm assembly 60 and a diaphragm cover 70. The diaphragm cover 70 can be installed on an end of the float base 20 away from the body 10 and connected with the body 10, in order to form the second chamber 21b. The diaphragm assembly 60 can be installed on the float base 20 and a diaphragm chamber 61 can be formed between the diaphragm assembly 60 and the diaphragm cover 70. The diaphragm assembly 60 and the second magnet 42 can be separate from each other. The second magnet 42 can be pushed to close to the first magnet 41 by a movement of the diaphragm assembly 60.

It can be understood that the diaphragm assembly 60 and the second magnet 42 are independent, so that it can avoid any impact of the diaphragm assembly 60 on the second magnet 42, thereby avoiding the first magnet 41 and the thimble 51 to vibrate, which may cause the passage 32 failing to be sealed by the thimble 51 and affect the stability of the oil supply from the float chamber 21 to the oil passing passage 31 and the passage 32. In other words, because the diaphragm assembly 60 and the second magnet 42 are independent, the passage 32 can be better sealed by the thimble 51 and the stability of the fuel supply can be improved. In one embodiment, the diaphragm assembly 60 can include a diaphragm 62 and an ejector rod 63. The magnetic sleeve assembly 30 can be further provided with a through hole 36 communicating with the second mounting hole 34. One end of the ejector rod 63 can be fixed on the diaphragm 62, and the other end of the ejector rod 63 can penetrate through the through hole 36 by the diaphragm 62, in order to push the second magnet 42 toward the first magnet 41, thereby pushing the thimble 51 to seal the passage 32.

It can be understood that the transmission between the diaphragm 62 and the second magnet 42 can be realized by the ejector rod 63, so that a vibration impact of the diaphragm 62 on the second magnet 42 can be reduced, avoiding influence on the sealing effect of the thimble 51 and stability of oil passing caused by the diaphragm 62 vibration.

The diaphragm cover 70 can be further provided with a gas passage 18. The diaphragm chamber 61 can communicate with the gas passage 18. When the gas passage 18 is opened, the diaphragm 62 will vibrate under the pressure of the gas and drive the ejector rod 63 to move, penetrate through the through hole 36 and extend into the second mounting hole 34. The ejector rod 63 will push the second magnet 42 to move towards the first magnet 41, so as to drive the thimble 51 to seal the passage 32 and cut off the oil or fuel. The communication between the fuel passages 15 and the oil passing passage 16 will be cut off, which makes it impossible for the fuel or oil in the first chamber 21a to enter the venturi 13, and the gas will be provided to the engine through the gas passage 18. That is, gas and fuel can be switched and supplied.

The diaphragm assembly 60 can further include a positioning block 65 and a support plate 65. The support plate 64 can be fixed on one side of the diaphragm 62 near the second magnet 42. The positioning block 64 can be fixed on the other side of the diaphragm 62 near the diaphragm cover 70. One end of the ejector rod 63 can be fixed to the positioning block 64, and the other end of the ejector rod 63 can penetrate through the diaphragm 62 and the support plate 64, and extend towards the magnetic sleeve assembly 30.

The working principle of the carburetor 100 can be illustrated as follows:

(1) No Gas Supply

Referring to FIG. 1, the gas passage 18 is in a closed state, and the diaphragm 62 and the ejector rod 63 are in an un-working state. The second magnet 42 is located at the bottom of the second mounting hole 34 under the action of gravity. The first magnet 41 is located at the bottom of the first mounting hole 33 under the action of gravity and elasticity of the elastic member 52. The thimble 51 is in a downward position under the action of the elastic member 52. At this time, the float chamber 21 communicates with the oil passing passage 16 through the fuel passing hole 31 and the passage 32. That is, fuel will enter the nozzle 12 and the venturi 13 through the fuel passage 15, the float chamber 21, the fuel passing hole 31, the passage 32, the oil passing passage 16 and the main measuring hole 14 in order, and can be mixed with air to form a mixed gas for the engine.

(2) Gas Supply

Referring to FIG. 2, when the gas is turned on, a part of the gas will enter the diaphragm chamber 61 by an inlet gas passage 18. The diaphragm 62 will vibrate under the gas pressure, thereby driving the ejector rod 63 to move upwards, penetrate the through hole 36 and enter into the second mounting hole 34. The second magnet 42 will be pushed to move towards the first magnet 41. The first magnet 41 will overcome the force of the elastic member 52 under the repulsion of the second magnet 42 and drive the thimble 51 to move along the third mounting hole 35 until the passage 32 is sealed. The communication between the oil passing passage 16 and the float chamber 21 will be cut off, to switch to gas supply from oil supply.

(3) Oil Supply

When the gas passage 18 is closed or cut off, the force on the diaphragm 62 disappears, so that the diaphragm 62 returns to its original state, the second magnet 42 also returns to its original state under the action of gravity. The thimble 51 will be reset by the action of the elastic member 52, that is, the passage 32 is opened. At this time, the float chamber 21 will communicate with the oil passing passage 16, and the oil can be supplied.

The technical features of the above-described embodiments may be combined in any combination. For the sake of brevity of description, all possible combinations of the technical features in the above embodiments are not described. However, as long as there is no contradiction between the combinations of these technical features, all should be considered as the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A carburetor, comprising a body and a float base connected to the body, the float base comprises a float chamber, the body comprises a fuel passage and an oil passing passage, and the fuel passage communicating with the float chamber;
the carburetor further comprises a magnetic sleeve assembly, a magnet assembly and a thimble assembly, the magnetic sleeve assembly is fixed to the float base, and a first end of the magnetic sleeve assembly extends into the oil passing passage and is connected to the body;
the first end of the magnetic sleeve assembly comprises a fuel passing hole and a passage, the fuel passing hole communicates with the float chamber, and the passage communicates with the oil passing passage;
both the thimble assembly and the magnet assembly are installed in the magnetic sleeve assembly, the thimble assembly is configured for cutting off the passage under driving of the magnet assembly, in order to cut off a communication between the oil passing passage and the float chamber;
the magnetic sleeve assembly comprises a fixing sleeve and a connecting sleeve, the fuel passing hole and the passage are located in the connecting sleeve, the magnet assembly is installed on the fixing sleeve, and the fixing sleeve and the connecting sleeve are connected with each other and both are fixed on the float base;
the magnetic sleeve assembly comprises a first mounting hole and a second mounting hole separated from each other, the magnet assembly comprises a first magnet and a second magnet, the first magnet and the thimble assembly are installed in the first mounting hole, the second magnet is installed in the second mounting hole, the first magnet and the second magnet are mutually exclusive, and the second magnet is movable in the second mounting hole, so that the first magnet is able to move in the first mounting hole under an action of a repulsion of the second magnet, resulting in driving the thimble assembly to cut off the passage;
the carburetor further comprises a diaphragm assembly and a diaphragm cover, the diaphragm cover is installed on the float base, the diaphragm assembly is installed on the float base and a diaphragm chamber is formed between the diaphragm assembly and the diaphragm cover, the diaphragm assembly and the second magnet are separate from each other, and the second magnet can be moved close to the first magnet by a movement of the diaphragm assembly;
the diaphragm assembly comprises a diaphragm and an ejector rod, the magnetic sleeve assembly further comprises a through hole communicating with the second mounting hole, one end of the ejector rod is fixed on the diaphragm, and the other end of the ejector rod can penetrate through the through hole by the diaphragm, in order to push the second magnet toward the first magnet.

2. The carburetor of claim 1, wherein the thimble assembly comprises a thimble and an elastic member, the magnetic sleeve assembly further comprises a third mounting hole between the passage and the first mounting hole, a first end of the thimble extends into the third mounting hole and is configured for cutting off the passage, a second end of the thimble is located in the first mounting hole, and the elastic member is installed in the first mounting hole and configured for resetting the thimble.

3. The carburetor of claim 2, wherein an axis of the thimble coincides with an axis of the passage.

4. The carburetor of claim 1, wherein a mounting portion is located on an inner wall of the float chamber, the float chamber is divided into a first chamber and a second chamber, the mounting portion comprises a fourth mounting hole, the fixing sleeve is located in the second chamber, one end of the connecting sleeve is connected to the fixing sleeve and the other end of the connecting sleeve penetrates through the fourth mounting hole, extends into the first chamber and is connected to the body, and the passage and the fuel passing hole are located at one end of the connecting sleeve protruding into the first chamber.

5. The carburetor of claim 1, wherein the diaphragm cover comprises a gas passage communicating with the diaphragm chamber;
when the gas passage is opened, the diaphragm vibrates under a pressure of the gas and drives the ejector rod to push the second magnet toward the first magnet.

6. The carburetor of claim 1, wherein the diaphragm assembly further comprises a positioning block and a support plate, the support plate is fixed on one side of the diaphragm near the second magnet, the positioning block is fixed on another side of the diaphragm near the diaphragm cover, one end of the ejector rod is fixed to the positioning block, and the other end of the ejector rod penetrates through the diaphragm and the support plate, and extends towards the magnetic sleeve assembly.

* * * * *